United States Patent [19]

Kulling et al.

[11] Patent Number: 4,891,206

[45] Date of Patent: Jan. 2, 1990

[54] PROCESS FOR THE REMOVAL OF UNDESIRABLE METAL IONS, ESPECIALLY VANADIUM IONS, IN THE CONCENTRATION OF DILUTE IRON(II) SULFATE-CONTAINING SULFURIC ACID SOLUTIONS

[75] Inventors: Achim M. Kulling, Odenthal-Glöbusch; Helmut Steinhausen, Odenthal, both of Fed. Rep. of Germany

[73] Assignee: Kronos Titan, GmbH, Leverkusen, Fed. Rep. of Germany

[21] Appl. No.: 641,708

[22] Filed: Aug. 17, 1984

[30] Foreign Application Priority Data

Aug. 18, 1983 [DE] Fed. Rep. of Germany ....... 3329842

[51] Int. Cl.$^4$ .............................. C01B 17/90; C01G 33; C01G 00; C01G 77/04; C01G 49/14
[52] U.S. Cl. ..................................... 423/531; 423/66; 423/67; 423/83; 423/146; 423/DIG. 2
[58] Field of Search ................. 423/522, 531, DIG. 2, 423/66, 67, 83, 544, 146

[56] References Cited

U.S. PATENT DOCUMENTS

| | | | |
|---|---|---|---|
| 2,413,641 | 12/1946 | McAdam | 423/83 |
| 2,416,216 | 2/1947 | Rau et al. | 423/83 |
| 2,905,530 | 9/1959 | Gregoire | 423/544 |
| 3,094,386 | 6/1963 | Wigginton | 423/83 |
| 3,236,596 | 2/1966 | Zirngibl | 423/83 |
| 3,416,885 | 12/1968 | Honchar | 423/83 |
| 3,533,742 | 10/1970 | Oster | 423/DIG. 2 |
| 4,288,415 | 9/1981 | Rahm et al. | 423/83 |

FOREIGN PATENT DOCUMENTS

| | | | |
|---|---|---|---|
| 536999 | 2/1957 | Canada | 423/83 |
| 199133 | 8/1967 | U.S.S.R. | 423/531 |
| 279786 | 1/1928 | United Kingdom | 423/83 |

*Primary Examiner*—Gary P. Straub
*Attorney, Agent, or Firm*—Burns, Doane, Swecker & Mathis

[57] ABSTRACT

A process for the extensive removal of undesirable metal ions, particularly vanadium ions, in the course of the concentration of dilute iron(II) sulfate-containing sulfuric acid solutions. The sulfuric acid solutions are concentrated by the evaporation of water and the separation of iron(II) sulfate to a content of 60 to 70% by weight $H_2SO_4$. According to the invention, the content of trivalent titanium in the solution is adjusted such that the content of trivalent iron does not exceed 0.1 g/l. The trivalent titanium may be added from the outside, if not already present in an adequate amount in the solution, or may be formed in situ from the tetravalent titanium present in the solution by the addition of a reducing agent. Prior to the final concentration, part of the iron may be precipitated and separated as iron(II) sulfate heptahydrate by means of preconcentration and cooling of the preconcentrated sulfuric acid solution.

15 Claims, No Drawings

PROCESS FOR THE REMOVAL OF UNDESIRABLE METAL IONS, ESPECIALLY VANADIUM IONS, IN THE CONCENTRATION OF DILUTE IRON(II) SULFATE-CONTAINING SULFURIC ACID SOLUTIONS

BACKGROUND OF THE INVENTION

1. Field of the Invention

The present invention relates to a process for the extensive removal of undesirable metal ions, particularly vanadium ions during the concentration of dilute, iron(II) sulfate containing sulfuric acid solutions by the evaporation of water and separation of the iron(II) sulfate whereby the dilute sulfuric acid solution is concentrated to a content of 60 to 70% by weight $H_2SO_4$.

2. Description of the Prior Art

In the production of titanium dioxide pigments by means of hydrolysis from titanium sulfate solutions, large volumes of dilute, iron(II) sulfate-containing sulfuric acid solution are obtained following the separation of the titanium dioxide hydrate. In addition to containing 8 to 25% by weight $H_2SO_4$, the solutions contain greater or lesser amounts of iron(II) sulfate and compounds of other elements, such as Ti, Al, Zn, Mg, Mn, V, Ca, Cr, Cu. This sulfuric acid solution shall be designated hereinafter as the "dilute acid".

There exists the problem of further utilization of the dilute acid. It is particularly desirable to utilize the sulfuric acid component of the dilute acid for the manufacture of titanium dioxide by recycling. It is necessary for this purpose to concentrate the dilute acid and to separate the iron(II) sulfate and the sulfates of other metals obtained in the process. A particular requirement is to remove extensively elements which form colored ions or colored compounds or they otherwise become concentrated in the course of the process and lead to a deterioration of the titanium oxide pigments. These elements, which interfere even in very small amounts, are difficult to remove adequately in an economical manner and include both chromium and vanadium. The removal of these elements is especially difficult when titanium-containing raw materials relatively high in chromium and vanadium are processed, such as for example certain ilmenites or slags, and the dilute acid obtained is to be completely recycled for reasons of the protection of the environment.

A known process is set forth in DE-OS 26 18 121 whereby the undesirable metal ions, in particular chromium ions, but also vanadium ions, are removed in adequate amounts during the concentration of dilute iron(II) sulfate containing sulfuric acid solutions. According to this process, the dilute sulfuric acid solution or a preconcentrated sulfuric acid solution obtained from it without the separation of metal salts, is fed continuously to a receiver containing a sulfuric acid bearing metal salt suspension, the liquid component thereof containing 60 to 70% by weight $H_2SO_4$, and simultaneously sufficient water is evaporated to maintain the sulfuric acid concentration in the liquid component of the metal salt suspension within a range of 60 to 70% by weight, while continuously or in certain intervals, part of the sulfuric acid containing metal salt suspension is drawn off the receiver whereupon the precipitated salts are separated. In the course of concentration, iron precipitates as iron (II) sulfate monohydrate and entrains the undesirable elements.

In the practical application of this process, it is advisable for reasons of economy to perform the evaporation in a concentration range of 20 to 30% by weight $H_2SO_4$ in a direct heat exchange with hot exhaust gases. This unavoidably leads to an intensive contact between the exhaust gas and the sprayed sulfuric acid solution. With this method of operation, conditions may occur wherein the separation of vanadium is less than satisfactory.

While seeking the causes of this behavior of vanadium, it was discovered that the efficiency of the precipitation of vanadium is related to the state of oxidation of the sulfuric acid solution. The dilute acid from the production of titanium oxide normally contains small amounts of trivalent titanium whereby the simultaneous presence of trivalent iron is excluded. Trivalent titanium is oxidized to the tetravalent state upon contact with atmospheric oxygen even at ambient temperatures and increasingly at elevated temperatures. Simultaneously, trivalent iron may appear in the solution. Systematic investigations have revealed that the bonding of vanadium (and occasionally also of chromium) to the iron salts produced in the course of concentration declines if trivalent iron is present in the solution. The mechanism of the process is not clear, as the precipitation of vanadium does not involve the exceeding of the solubility limit, but a coprecipitation phenomenon is believed to occur which probably depends on the degree of oxidation of vanadium.

DETAILED DESCRIPTION OF THE INVENTION

A novel process has now been discovered for the extensive removal of undesirable metal ions, particularly vanadium ions, in the course of the concentration of dilute metal iron (II) sulfate containing sulfuric acid solutions by the evaporation of water and the separation of iron(II) sulfate wherein the dilute sulfuric acid solution is concentrated to a content of 60 to 70% by weight $H_2SO_4$. The process is characterized in that during the concentration (e.g., by evaporation) of the sulfuric acid solution, trivalent titanium is used to assure that the trivalent iron content of the solution does not exceed 0.1 g/l.

In the present process, if necessary, the maximum acceptable amount of trivalent iron may be also specified at a value significantly less than 0.1 g/l or the presence of trivalent iron in the sulfuric acid solution may be avoided altogether.

The term "vanadium ions" is defined herein to include all ions in the solution consisting or containing vanadium, for example including vanadyl ions.

Generally, the sulfuric acid solution should not contain more than approximately 2 g/l of trivalent titanium (calculated as $TiO_2$) during the evaporation. In certain special cases, the amount of trivalent titanium in the sulfuric acid solution may be higher.

If the dilute acid contains an adequate amount of trivalent titanium even prior to the evaporation step, the condition according to the invention may be satisfied by effecting the evaporation with the avoidance of oxidizing conditions, specifically with the exclusion of air. Otherwise, it is necessary to add trivalent titanium and/or appropriate reducing agents, prior to the rise of the trivalent iron content in the sulfuric acid solution over 0.1 g/l.

A suitable embodiment of the invention consists of the addition of trivalent titanium from outside the sulfuric acid solution. The dilute solution usually contains small amounts of tetravalent titanium. From this, it is possible to produce trivalent titanium in the sulfuric acid solution. Accordingly, a preferred form of embodiment of the invention is characterized in that trivalent titanium is produced in the sulfuric acid solution by the addition of a reducing agent to the sulfuric acid solution containing tetravalent titanium.

Any substance that reduces trivalent iron to bivalent iron or tetravalent titanium to trivalent titanium, respectively, under the prevailing conditions, may be used as the reducing agent, provided that its reaction products do not interfere with the recycling of the concentrated sulfuric acid solution. An advantageous embodiment of the invention is characterized in that finely distributed iron or sodium formaldehydesulfoxylate is used as the reducing agent. In order to assure the presence at all times of an adequate amount of trivalent titanium in the solution, the reducing agent may be added in excess with respect to the amount of tetravalent titanium in the solution.

By the presence, the addition or the formation of trivalent titanium, the trivalent iron present in the solution is adequately reduced, while it is further assured that during the precipitation and separation of the iron-(II) sulfate no harmful amounts of trivalent iron are formed.

The content of trivalent titanium in the sulfuric acid solution may be adjusted at different stages of the process. It is merely necessary to insure that at this point of the process a certain amount of iron(II) sulfate is still in the solution. As a general rule, the amount of iron(II) sulfate should not be less than 50 g $FeSO_4$ per kg of $H_2SO_4$. If the dilute acid contains only very small amounts of chromium in addition to the vanadium, the necessary quantity of the iron(II) sulfate may be even lower. In such a case it may be required, however, to reduce the trivalent iron content to significantly less than 0.1 g/l in the sulfuric acid solution or even to completely eliminate the presence of trivalent iron. The amount of iron(II) sulfate necessary is readily determined by experimentation. If the iron(II) sulfate content is insufficient, no adequate precipitation of vanadium and of chromium occurs; they are precipitated together with the iron(II) sulfate monohydrate.

A preferred form of embodiment of the invention consists of adjusting the content of trivalent titanium in the dilute sulfuric acid solution prior to evaporation. The evaporation may then be effected in any manner, for example in a single stage or in multiple stages, with or without an intermediate precipitation of iron(II) sulfate heptahydrate.

A great advantage of the present invention consists of the fact that, in contrast to DE-OS 26 18 121, vanadium and also chromium ions are removed efficiently even if part of the iron(II) sulfate is precipitated prematurely.

Accordingly, a preferred embodiment of the invention is characterized in that the evaporation is effected in two stages, wherein following the first stage, crystallized iron(II) sulfate is separated from the sulfuric acid solution by cooling and a trivalent titanium content is established after the separation in the sulfuric acid solution. In this mode of operation, it is not necessary to perform the first stage of evaporation and the precipitation of the iron(II) sulfate heptahydrate under reducing conditions so that potentially a savings in reducing substances may be achieved. For example, the dilute solution can be initially preconcentrated to a sulfuric acid content of approx. 28% by weight $H_2SO_4$ and then cooled to approximately 20° C. whereupon the iron(II) sulfate heptahydrate precipitated is separated and the filtrate further concentrated, following the necessary adjustment of the trivalent titanium content.

The invention will become more apparent from the following comparative and inventive examples:

COMPARATIVE EXAMPLE

A dilute acid with 23% by weight $H_2SO_4$ is used. This dilute acid is concentrated in a circulating evaporator to a $H_2SO_4$ content of 28% by weight by means of indirect heating. The resulting solution is cooled to room temperature. In the process, iron(II) sulfate heptahydrate is precipitated and is separated from the solution. The filtrate (designated "preconcentrated sulfuric acid solution" hereinafter) has the following composition:

| | |
|---|---|
| $H_2SO_4$ | 28.8% by weight |
| Fe | 2.89% by weight |
| Cr | 764 mg Cr/kg $H_2SO_4$ |
| V | 1670 mg V/kg $H_2SO_4$ |

In this preconcentration step, the dilute acid is oxidized and afterwards has a trivalent iron content of 1 g/l.

The preconcentrated sulfuric acid solution is concentrated in an indirectly heated 100 l vessel under vacuum to a $H_2SO_4$ content of 64.4% by weight. The precipitated salts consisting of mainly of iron(II) sulfate monohydrate, are filtered off and the filtrate is analyzed. The filtrate has a chromium content of 512 mg Cr/kg $H_2SO4$ and a vanadium content of 854 mg V/kg $H_2SO_4$.

EXAMPLE 1

The comparative experiment is repeated with the difference that different amounts of iron powder are added to the preconcentrated sulfuric acid solution. Results from analyzing the filtrates are summarized in the following Table. The result of the comparative experiment is listed for comparison.

| Fe addition (g/l) | Cr content (mg Cr/kg $H_2SO_4$) | V content (mg V/kg $H_2SO_4$) |
|---|---|---|
| without addition (comparative exp.) | 512 | 854 |
| 1.5 | 478 | 432 |
| 3.0 | 483 | 378 |
| 4.9 | 472 | 228 |

The table shows that by the precipitation of iron(II) sulfate monohydrate during the concentration of the preconcentrated sulfuric acid solution even without the addition of iron a certain amount of chromium and vanadium is removed from the sulfuric acid solution. The amount of vanadium remaining in the solution is, however, too high for a useful application of the concentration sulfuric acid solution in the production of titanium dioxide. The addition of iron further reduces the amount of the vanadium remaining in solution during concentration to a significantly greater degree. It is possible to recycle the acid obtained directly into the titanium dioxide manufacturing process. The quantity of the iron powder added is small enough so that the neutralization of the concentrated sulfuric acid solution encounters no problems in this respect.

EXAMPLE 2

Example 1 is repeated with the difference that sodium formaldehydesulfoxylate is added in an amount of 2 g per liter of the preconcentrated sulfuric acid solution.

The filtrate obtained has a chromium content of 436 mg Cr/kg $H_2SO_4$ and a vanadium content of 426 mg V/kg $H_2SO_4$.

The acid obtained could be recycled directly into the titanium dioxide manufacturing process.

The invention being thus described and exemplified, it will be obvious that the invention may be varied in many ways. Such variations are not to be regarded as a departure from the spirit and scope of the invention and all such modifications are intended to be included within the scope of the following claims.

We claim:

1. A process for the removal of vanadium ions during the concentration of a dilute iron (II) sulfate-containing sulfuric acid solution resulting from the hydrolysis of a titanyl sulfate solution in the production of titanium dioxide comprising adjusting the trivalent titanium content of said dilute iron (II) sulfate-containing sulfuric acid solution to obtain a trivalent iron content of not more than 0.1 g/l, concentrating the solution to a sulfuric acid content of 60 to 70% $H_2SO_4$ by the evaporation of water whereby iron (II) sulfate monohydrate and vanadium compounds are precipitated and separating recipitated iron (II) sulfate monohydrate and vanadium compounds from the concentrated solution.

2. The process according to claim 1 wherein trivalent titanium is added to the solution.

3. The process according to claim 2 wherein the trivalent titanium content of the dilute sulfuric acid solution is adjusted prior to initiating evaporation.

4. The process according to claim 2 wherein the evaporation is effected in two stages and wherein after the first stage, crystallized iron(II) sulfate heptahydrate is separated by cooling from the sulfuric acid solution and thereafter the content of trivalent titanium in the sulfuric acid solution is adjusted.

5. The process according to claim 1 wherein the solution contains tetravalent titanium and the trivalent titanium is produced in the sulfuric acid solution by adding a reducing agent to the sulfuric acid solution.

6. The process according to claim 5 wherein the reducing agent is finely divided and is selected from the group consisting of iron and sodium formaldehydesulfoxylate.

7. The process according to claim 6 wherein the trivalent titanium content of the dilute sulfuric acid solution is adjusted prior to the initiating evaporation.

8. The process according to claim 6 wherein the evaporation is effected in two stages and wherein after the first stage, crystallized iron(II) sulfate heptahydrate is separated by cooling from the sulfuric acid solution and thereafter the content of trivalent titanium in the sulfuric acid solution is adjusted.

9. The process according to claim 5 wherein the trivalent titanium content of the dilute sulfuric acid solution is adjusted prior to initiating evaporation.

10. The process according to claim 1 wherein the trivalent titanium content of the dilute sulfuric acid solution is adjusted prior to initiating evaporation.

11. The process according to claim 5 wherein the reducing agent is sodium formaldehydesulfoxylate.

12. The process according to claim 5 wherein the evaporation is effected in two stages and wherein after the first stage, crystallized iron(II) sulfate heptahydrate is separated by cooling from the sulfuric acid solution and thereafter the content of trivalent titanium in the sulfuric acid solution is adjusted.

13. The process according to claim 1 wherein the evaporation is effected in two stages and wherein after the first stage, crystallized iron(II) sulfate heptahydrate is separated by cooling from the sulfuric acid solution and thereafter the content of trivalent titanium in the sulfuric acid solution is adjusted.

14. The process according to claim 1 wherein the adjusting of the trivalent titanium content of said dilute iron (II) sulfate-containing sulfuric acid solution to obtain a trivalent iron content of not more than 0.1 g/l is conducted after the hydrolysis of the titanyl sulfate solution and after separation of titanium dioxide hydrate therefrom.

15. The process according to claim 1 wherein the concentration of iron sulfate in said dilute iron (II) sulfatecontaining solution is not less than 50 g per kg of $H_2SO_4$.

* * * * *